US012793604B2

United States Patent
Su

(10) Patent No.: US 12,793,604 B2
(45) Date of Patent: Nov. 10, 2026

(54) DRIVING STRUCTURE FOR DISPLAY PANEL

(71) Applicant: Sitronix Technology Corporation, Hsinchu County (TW)

(72) Inventor: Chung-Hsin Su, Hsinchu County (TW)

(73) Assignee: SITRONIX TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 19/036,013

(22) Filed: Jan. 24, 2025

(65) Prior Publication Data

US 2025/0246115 A1 Jul. 31, 2025

Related U.S. Application Data

(60) Provisional application No. 63/624,807, filed on Jan. 25, 2024.

(51) Int. Cl.
*G09G 3/20* (2006.01)
*G09G 3/32* (2016.01)

(52) U.S. Cl.
CPC ............. *G09G 3/2092* (2013.01); *G09G 3/32* (2013.01); *G09G 2330/021* (2013.01); *G09G 2370/08* (2013.01)

(58) Field of Classification Search
CPC .. G09G 3/2092; G09G 3/32; G09G 2330/021; G09G 2370/08
See application file for complete search history.

(56) References Cited

U.S. PATENT DOCUMENTS

| | | | | |
|---|---|---|---|---|
| 6,067,083 | A * | 5/2000 | Glen | G09G 5/18 345/213 |
| 7,827,424 | B2 * | 11/2010 | Bounitch | G06F 1/3203 713/320 |
| 8,325,172 | B2 * | 12/2012 | Yonemochi | G09G 3/3688 345/208 |
| 10,852,867 | B2 * | 12/2020 | Wu | G06F 3/0412 |
| 10,872,555 | B2 | 12/2020 | Shikata | |
| 11,600,220 | B2 * | 3/2023 | Xiu | G09G 3/32 |
| 2018/0075819 | A1 * | 3/2018 | Chen | G09G 5/18 |
| 2021/0312855 | A1 | 10/2021 | Jeong et al. | |
| 2022/0375398 | A1 * | 11/2022 | Liao | G09G 3/32 |
| 2024/0152196 | A1 * | 5/2024 | Garcia | G06F 1/3287 |
| 2025/0225941 | A1 * | 7/2025 | Zhang | G09G 3/3233 |

FOREIGN PATENT DOCUMENTS

| | | |
|---|---|---|
| TW | 201430799 A | 8/2014 |
| TW | 202230320 A | 8/2022 |
| TW | 202316406 A | 4/2023 |

OTHER PUBLICATIONS

Taiwan Intellectual Property Office Official action on Dec. 11, 2025.
Taiwan Intellectual Property Office Office Action Feb. 9, 2026.

* cited by examiner

*Primary Examiner* — Gene W Lee
(74) *Attorney, Agent, or Firm* — WPAT, PC

(57) ABSTRACT

The present application discloses a driving structure for display panel, which comprises a controller, at least one driver and data detection circuit. The controller is disposed on a display panel, the controller generates a data signal and a display clock signal. The at least one driver is disposed on a display panel, the at least one driver receives the data signal and a display clock signal. The data detection circuit detects content of the data signal.

28 Claims, 6 Drawing Sheets

DRIVING STRUCTURE FOR DISPLAY PANEL

FIELD OF THE INVENTION

The present application relates to a driving structure, particularly to a driving structure for a display panel.

BACKGROUND OF THE INVENTION

In a display panel with a plurality of drivers, a controller of the display panel transmits a plurality of clock signals to the drivers, which drives the drivers operate according to the timing of the clock signals to drive the light emitting components.

Generally, the controller continuously transmits display clock signals to the drivers, each driver includes a counter and a comparator, for driving the counter of each driver to keep counting and driving the comparators to keep comparing data correspondingly, so regardless of whether pixels are displayed, the dynamic power consumption of the drivers remains constant. In the display panel with the drivers, the display panel typically have a large number of drivers and light emitting components, and even if no image is displayed, the drivers are still in operation, and consuming a significant amount of power. Thereby, the overall power consumption of the display panel may be high due to the large number of drivers.

Based on the above, the present application provides a driving structure for display panels that overcomes the aforementioned higher power consumption issue, reduces the power consumption of the display panel according to the displayed image, thereby, the power energy is saved.

SUMMARY

An objective of the present application is to provide driving structure for a display panel, which includes a controller, at least one driver, and a data detection circuit. The data detection circuit controls the controller or at least one driver to selectively transmit display clock signals according to the content of the data signals.

An objective of the present application is to provide driving structure for a display panel, wherein when the data detection circuit detects that the content of the data signals is entirely non-display values, the controller stops generating or transmitting the display clock signals to drive the drivers stop the operation of driving the light emitting components, thereby, the power-saving effect is achieved.

An objective of the present application is to provide driving structure for a display panel, wherein when the data detection circuit detects that the content of the data signal is entirely non-display values, at least one driver stops transmitting display clock signals to drive the light emitting components turning off, thereby, the power saving effect is achieved.

The present application provides a driving structure for a display panel, including a controller, at least one driver, and a data detection circuit. The controller and at least one driver are disposed on the display panel. The controller generates a data signal and a display clock signal, which are received by at least one driver. The data detection circuit controls the controller or at least one driver to transmit the display clock signal according to a content of the data signal. By using this driving structure, the display panel may save power by not generating or stopping the display clock signal according to the content of the data signal.

DETAILED DESCRIPTION

To provide the esteemed reviewers with a further understanding and appreciation of the features and effects achieved by the present application, detailed explanations are provided herein along with examples.

Certain terms used in the specification and claims refer to specific components; however, those skilled in the art should understand that manufacturers may use different terms to refer to the same component. Furthermore, the specification and claims do not distinguish components based on the difference in terms, but rather on the technical differences of the components. The term “comprising” mentioned throughout the specification and claims is an open-ended term and should be interpreted as “including but not limited to.” Moreover, the term “coupling” here includes any direct and indirect means of connection. Therefore, if the text describes a first device coupled to a second device, it implies that the first device may be directly connected to the second device, or indirectly connected through other devices or means of connection.

Figure 1:
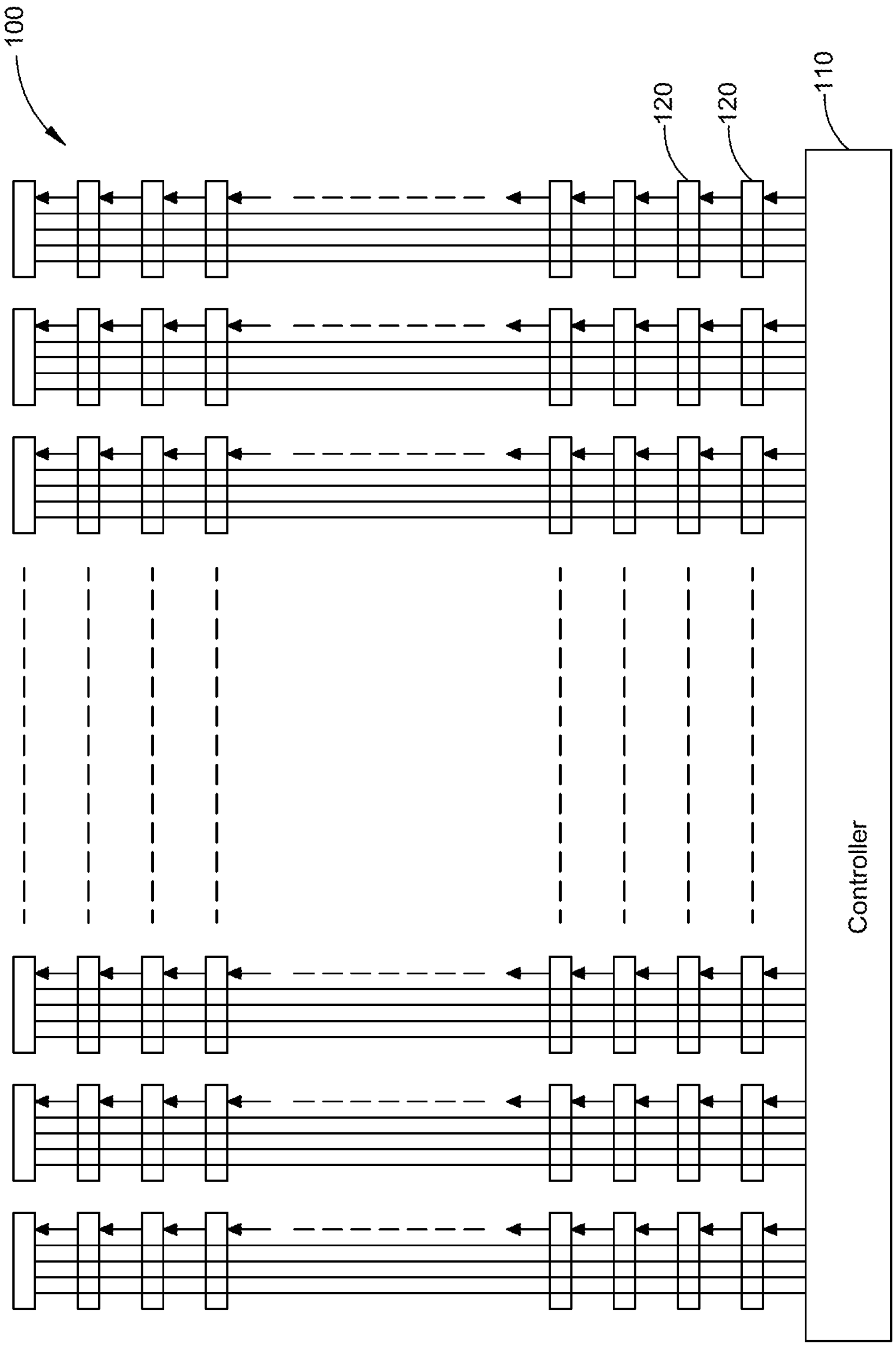
FIG. 1: which is a schematic diagram of the driving structure for the display panel according to the present application.

Please refer to FIG. 1, which is a schematic diagram of the driving structure for a display panel according to the present application. The driving structure according to the present application is configured to drive a display panel 100 to display images. The display panel 100 includes a controller 110 and at least one driver 120, with a plurality of drivers 120 exemplified in this embodiment. The controller 110 is disposed on the display panel 100 and is coupled to the at least one driver 120. The at least one driver 120 is disposed on the display panel 100, a plurality of drivers 120 in the same row are coupled in series.

Figure 2:
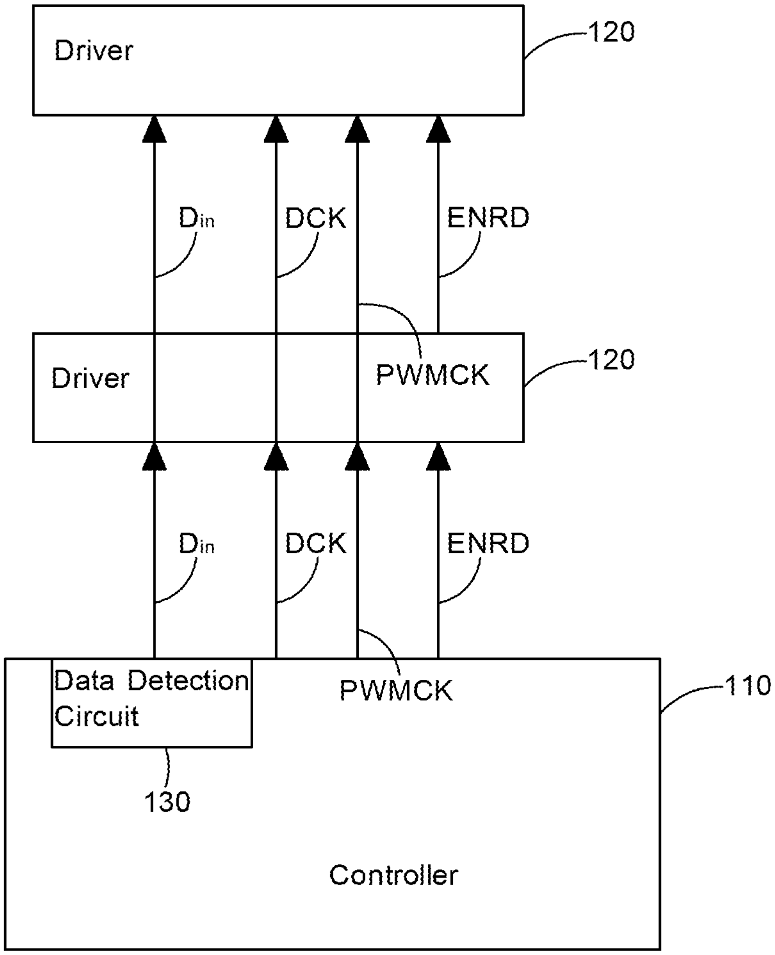
FIG. 2: which is a partial schematic diagram of the driving structure according to an embodiment of the present application.

Please refer to FIG. 2, which are a partial schematic diagram of the driving structure according to an embodiment of the present application. The driving structure according to the present application further includes a data detector 130. The controller 110 generates a data signal Din, a data clock signal DCK, a display clock signal PWMCK, and an enable signal ENRD. The controller 110 transmits the data signal Din, the data clock signal DCK, the display clock signal PWMCK and the enable signal ENRD to the at least one driver 120, and in this embodiment, the aforementioned signals are transmitted to a plurality of drivers 120.

In this embodiment, the data signal Din is a display data, which may be a serial data and include a plurality of pixel data, used for displaying images on the display panel 100. The data line transmitting the data signal Din is exemplified here as a single line, but the number of data lines may be varied depending on the size of display panel 100 or application circumstances. The data clock signal DCK is a timing signal, and the driver 120 receives the data signal Din according to the timing of the data clock signal DCK. The display clock signal PWMCK is a timing signal, and the driver 120 drives the light emitting components to turn on or off according to the timing of the display clock signal PWMCK. The enable signal ENRD is a timing signal, and the driver 120 is activated according to the enable signal ENRD, for example, when the driver 120 receives the enable signal ENRD, it indicates that the driver 120 is selected to drive the light emitting components displaying images. After the current driver 120 completes the transmission of the display data, the current stage of driver 120 outputs another enable signal ENRD to the next stage of driver 120, so that the next stage of driver 120 receives the enable signal ENRD and begins operating. The current stage of driver 120 is coupled to the next stage of driver 120 in series, as shown in FIG. 1.

In this embodiment, a data detection circuit 130 is disposed in controller 110, and the number of the data detection circuits 130 may be plural, which are set corresponding to the number of rows of drivers 120 longitudinally, for example, if there are N rows of drivers 120, then N data detection circuits 130 may be set corresponding to each row of drivers 120, where N is an integer greater than 0. The data signal Din is transmitted to the drivers 120 through the data detection circuit 130. The data detection circuit 130 detects the content of the data signal Din, and the controller 110 determines whether to generate or transmit the display clock signal PWMCK according to the detection results of the data detection circuit 130, when the data detection circuit 130 detects that the content of data signal Din is entirely non-display values, which is indicative of the light emitting components in display panel 100 corresponding to this row of drivers 120 without emitting light, with the non-display values exemplified as 0, for example, the color of the displayed image is black, then controller 110 stops generating or transmitting the display clock signal PWMCK to the corresponding drivers 120, thus the entire row of the drivers 120 do not receive the display clock signal PWMCK, and the drivers 120 stop the operation of driving the light emitting components, thereby a dynamic current is not generated and the power saving is achieved. In an embodiment, the non-display value is exemplified as 1.

When data detection circuit 130 detects that the content of data signal Din is not entirely non-display values, for example, when the data signal Din includes 1, which is indicative of at least one light emitting component in the display panel 100 corresponding to this row of drivers 120 emits light and display an image, then the controller 110 transmits the display clock signal PWMCK to the at least one driver 120 to carry out subsequent display driving operations.

In an embodiment, the data detection circuit 130 is disposed in the controller 110, and has the capability to detect the content of the data signal Din and to transmit the data signal Din. For example, when the data detection circuit 130 detects that the content of the data signal Din is not entirely 0, the data detection circuit 130 transmits the data signal Din to the at least one driver 120. In this embodiment, different functions are integrated into the data detection circuit 130 to simplify the overall circuit structure, the technical effect of reducing circuit size is achieved.

Figure 3:
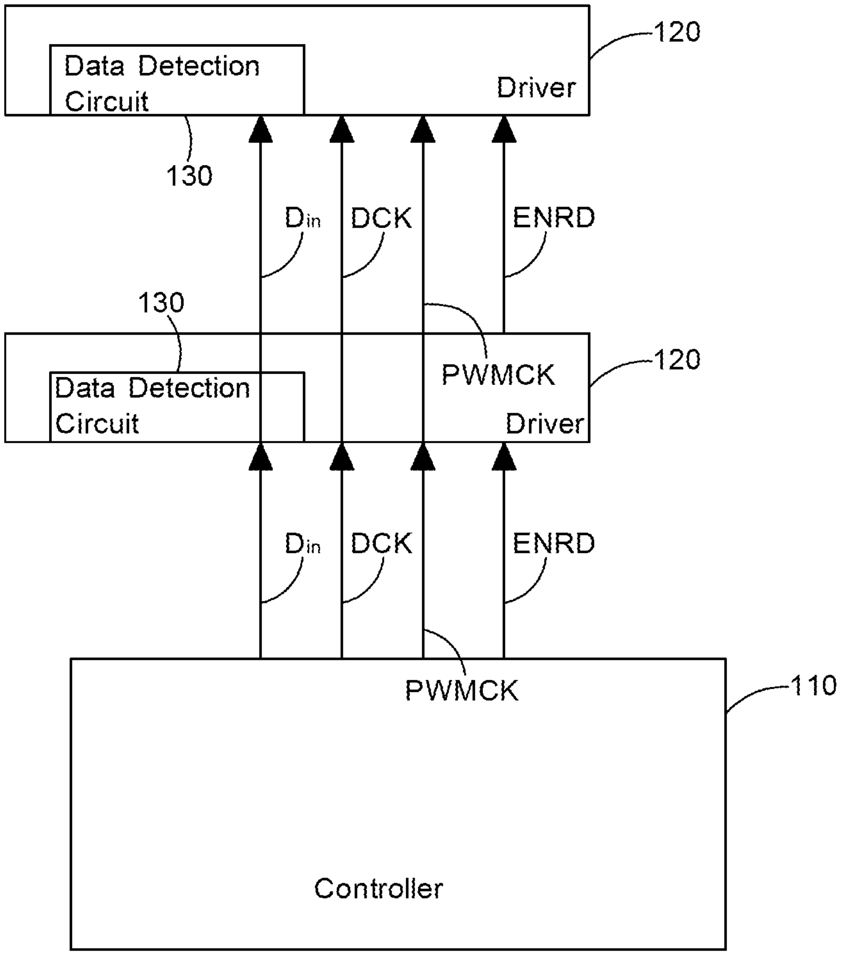
FIG. 3: which is a partial schematic diagram of the driving structure according to another embodiment of the present application.

Please refer to FIG. 3, in this embodiment, which is a partial schematic diagram of the driving structure according to another embodiment of the present application. In this embodiment, the data detection circuit 130 is disposed in the at least one driver 120, and for illustrative purposes, the data detection circuit 130 is disposed in each driver 120 in this embodiment. When the controller 110 transmits the enable signal ENRD to the driver 120, the driver 120 is enabled and prepared to receive data and drive the light emitting components. The driver 120 receives the data clock signal DCK, and receives the data signal Din according to the timing of the data clock signal DCK. The data detection circuit 130 in the driver 120 detects the content of the data signal Din, and when the data detection circuit 130 detects that the content of Din is entirely non-display values, the driver 120 stops receiving the display clock signal PWMCK, for example, causing the internal circuit components of the driver 120 to stop receiving the display clock signal PWMCK, or stopping the operation of the driver 120, such as stopping the operation of the internal circuit components of the driver 120, even if the internal circuit components of the driver 120 receive the display clock signal PWMCK, the internal circuit components of the driver 120 do not operate, thereby, stopping the operation of the corresponding light emitting components. In an embodiment, when the data detection circuit 130 detects that the content of the data signal Din is entirely non-display values, the data detection circuit 130 transmits a control signal to other internal circuit components of the driver 120, for controlling the other internal circuit components of the driver 120 to stop receiving the display clock signal PWMCK or to stop the operation, thereby, stopping proceeding with the operation of driving the light emitting components. In another embodiment, the driver 120 includes a counter, and when the data detection circuit 130 detects that the content of the data signal Din is entirely non-display values, the data detection circuit 130 transmits a control signal to the counter of the driver 120 to stop the counter of the driver 120 from receiving the display clock signal PWMCK or to stop the operation. Since the counter of the driver 120 operates according to the display clock signal PWMCK, when the counter of the driver 120 does not receive the display clock signal PWMCK, the counter of the driver 120 does not proceed with further counting actions, causing the corresponding light emitting components to not be driven and thus turned off. Moreover, when the counter of the driver 120 is not in operating, even if the counter of the driver 120 receives the display clock signal PWMCK, the counter of the driver 120 does not perform the counting operation. When the data detection circuit 130 detects the content of the data signal Din is not entirely non-display values, such as the data signal Din includes 1, the at least one driver 120 drives the corresponding light emitting component. After the current stage of the driver 120 receives the data signal Din, the current stage of the driver 120 transmits an enable signal to the next stage of the driver 120, and so on, until the final stage of the driver 120.

Figure 4:
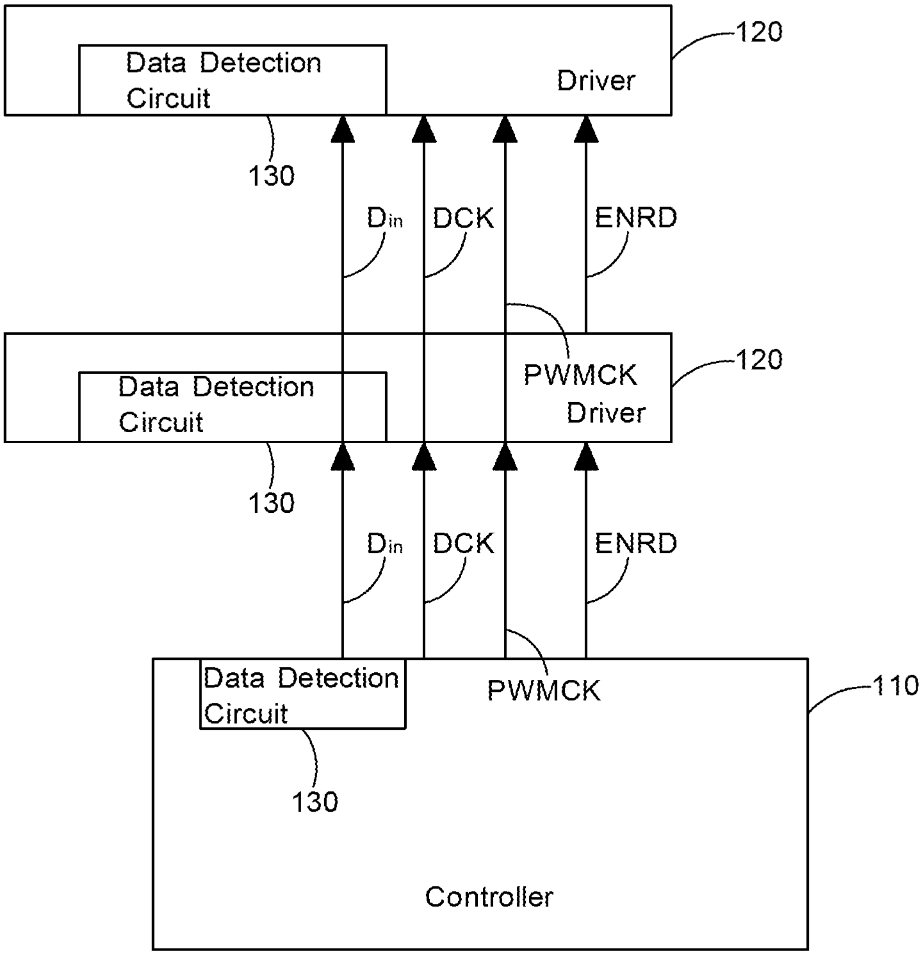
FIG. 4: which is a partial schematic diagram of the driving structure according to another embodiment of the present application.

Please refer to FIG. 4, which is a partial schematic of the driving structure according to another embodiment of the present application. In this embodiment, the data detection circuit 130 is disposed in both the controller 110 and the driver 120, thereby, the operation of detecting the content of the data signal Din may be performed in the controller 110, in the driver 120, or simultaneously in both the controller 110 and the driver 120. For example, when the data signal Din has a large amount of information, the operation of detecting the content of the data signal Din may be performed simultaneously in both the controller 110 and the driver 120 to ensure that the content of the data signal Din is accurately detected, using simultaneous detection on both sides to ensure the accuracy of data content detection.

Figure 5:
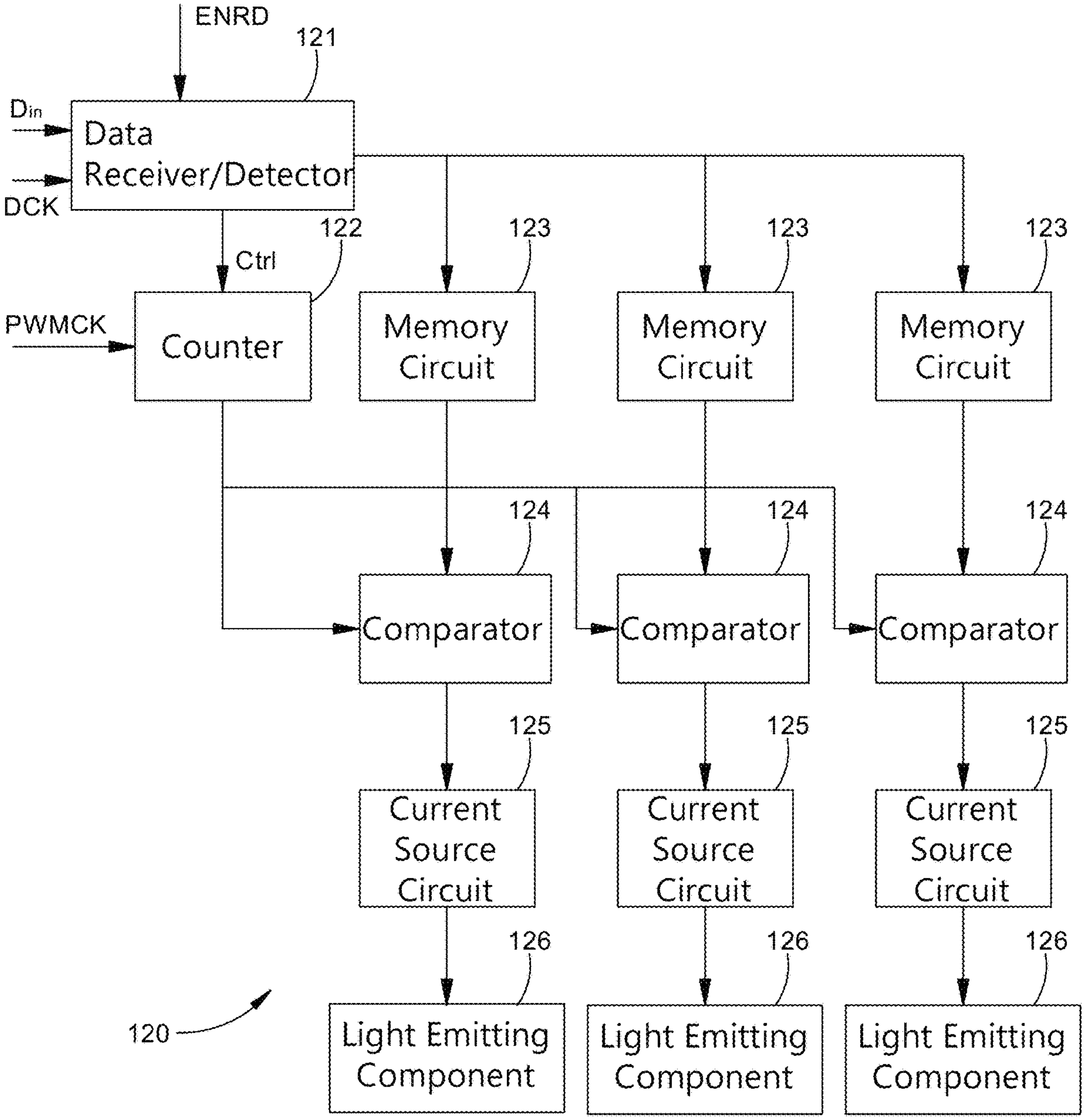
FIG. 5: which is a block schematic diagram of a driver according to an embodiment of the present application.

Please refer to FIG. 5, which is a block schematic diagram of a driver according to an embodiment of the present application. In this embodiment, the driver 120 includes a data receiver/detector 121, a counter 122, at least one memory circuit 123, at least one comparator 124, at least one current source circuit 125, and at least one light emitting component 126. In this embodiment, three memory circuits 123, three comparators 124, three current source circuits 125, and three light emitting components 126 are exemplified, that is, the driver 120 is coupled to and drives three light emitting components 126, but the present application is not limited thereto. The data receiver/detector 121 receives the enable signal ENRD generated by the controller 110 or transmitted by the previous stage of the driver 120, the data signal Din and the data clock signal DCK generated by the controller 110. In an embodiment, after the driver 120 receives the data signal Din, the driver 120 transmits another enable signal to the next stage of the driver 120 as the enable signal ENRD for the next stage of the driver 120. After the data receiver/detector 121 receives the enable signal ENRD, the driver 120 prepares to receive the data signal Din and drive the corresponding light emitting component 126, the data receiver/detector 121 receives the data signal Din according to the timing of the data clock signal DCK. The data receiver/detector 121 allocates the data signal Din to the memory circuit 123 according to a display screen of the display panel 100, wherein the memory circuit 123 stores the received data signal Din and transmits the data signal Din to the comparator 124.

The counter 122 receives the display clock signal PWMCK generated by the controller 110, and the counter 122 generates a counting signal to the comparator 124 according to the display clock signal PWMCK. The comparator 124 receives the data signal Din from the memory circuit 123 and the counting signal from the counter 122, compares the magnitude of these signals, and transmits a comparison result to the current source circuit 125. The current source circuit 125 drives the light emitting component 126 to turn on or off according to the comparison result from the comparator 124. For example, the comparator 124 compares the grayscale value of the data signal Din with the magnitude of the counting signal, and when the counting signal reaches or exceeds the grayscale value of the data signal Din, the comparison result is transmitted to the current source circuit 125, the current source circuit 125 activates the light emitting component 126 according to the comparison result. In another embodiment, when the grayscale value of the data signal Din is greater than or equal to the counting signal, the comparison result is generated to the current source circuit 125 for driving the light emitting component 126.

In an embodiment, the data detection circuit 130 is disposed in the data receiver/detector 121, when the data receiver/detector 121 of the driver 120 receives the data signal Din the data detection circuit 130 detects the content of the data signal Din, and when the content of the data signal Din is entirely non-display values, the data receiver/detector 121 transmits a control signal Ctrl to the counter 122 for causing the counter 122 to stop receiving the display clock signal PWMCK or to stop operating. When the counter 122 does not receive the display clock signal PWMCK, the counter 122 does not perform counting operations, even if the counter 122 receives the display clock signal PWMCK, the counter 122 does not perform the operation of counting when the counter 122 stops operating. This results in stopping the operation of driving the light emitting component 126, thereby, a technical effect of saving power consumption of display panel 100 is achieved.

Figure 6:
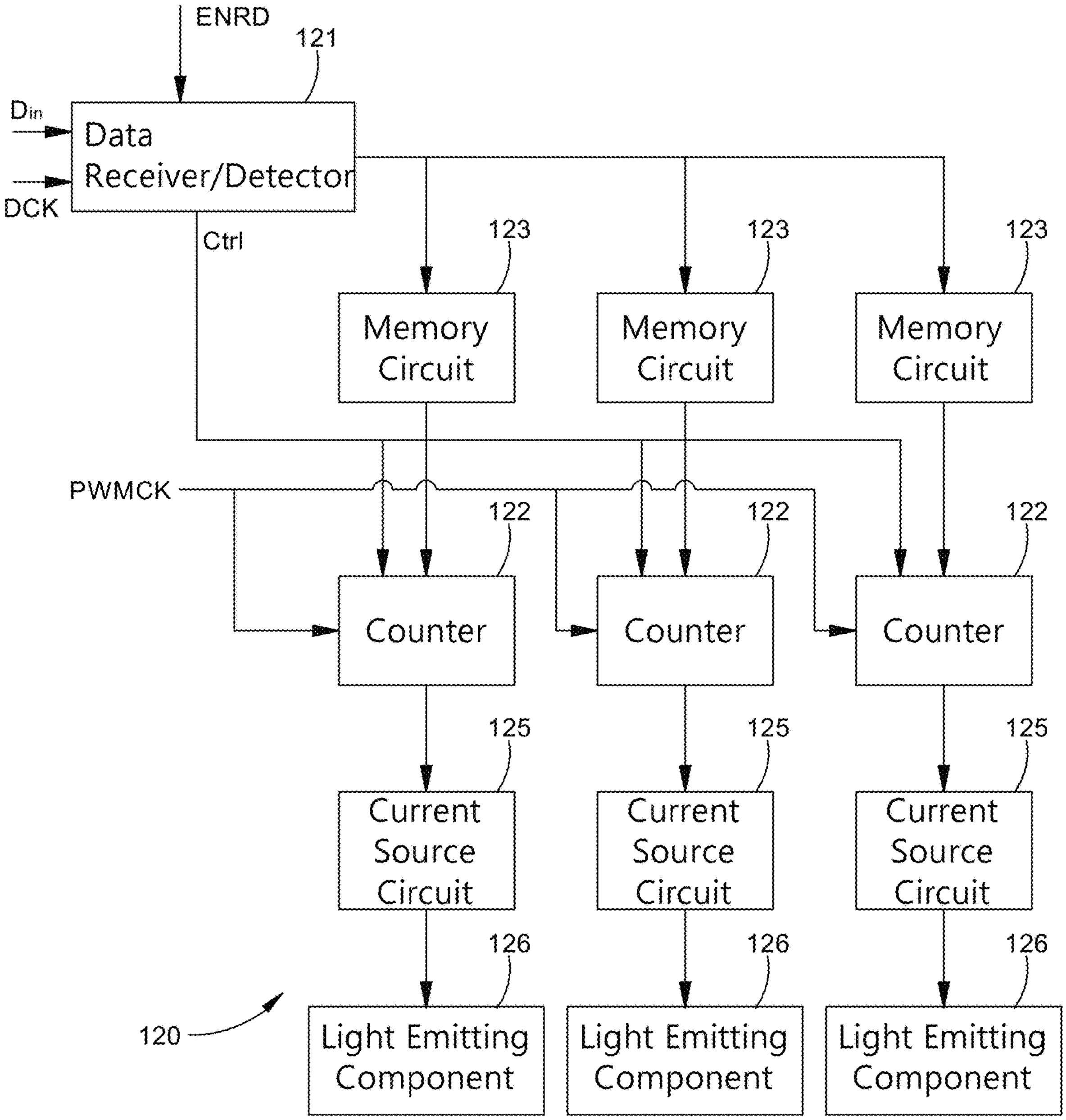
FIG. 6: which is a block schematic diagram of a driver according to another embodiment of the present application.

Please refer to FIG. 6, which is a block schematic diagram of a driver according to another embodiment of the present application. In this embodiment, the driver 120 includes a data receiver/detector 121, a counter 122, at least one memory circuit 123, at least one current source circuit 125, and at least one light emitting component 126. For convenience of explanation in this embodiment, three memory circuits 123, three current source circuits 125, and three light emitting components 126 are exemplified, that is, the driver 120 couples and drives the three light emitting components 126, but the present application is not limited thereto. The data receiver/detector 121 receives the enable signal ENRD generated by the controller 110 or transmitted by the previous stage driver 120, the data signal Din and the data clock signal DCK generated by the controller 110. In an embodiment, after the driver 120 receives the data signal Din, the driver 120 transmits another enable signal to the next stage of the driver 120 as the enable signal ENRD for the next stage of the driver 120. After the data receiver/detector 121 receives the enable signal ENRD, the driver 120 prepares to receive the data signal Din and drive the corresponding light emitting component 126, the data receiver/detector 121 receives the data signal Din according to the timing of the data clock signal DCK. The data receiver/detector 121 allocates the data signal Din to the memory circuit 123 according to the display screen of the display panel 100, wherein the memory circuit 123 stores the received data signal Din and transmits the data signal Din to the counter 122.

The counter 122 receives the data signal Din transmitted from the memory circuit 123 and the display clock signal PWMCK generated by the controller 110. The counter 122 generates a counting signal according to the display clock signal PWMCK and the grayscale value of the data signal Din, and the current source circuit 125 drives the light emitting component 126 to turn on or off according to the counting signal. For example, if the grayscale value of the data signal Din is 50, the counter 122 generates a counting signal corresponding to the grayscale value of 50 according to the timing of the display clock signal PWMCK, and transmits the counting signal to the current source circuit 125. The current source circuit 125 then activates the light emitting component 126 according to the counting signal, generating a brightness corresponding to the grayscale value of the data signal Din as 50.

In an embodiment, the data detection circuit 130 is disposed within the data receiver/detector 121. When the data receiver/detector 121 of the driver 120 receives the data signal Din, the data detection circuit 130 detects the content of Din. If the content of the data signal Din is entirely non-display values, the data receiver/detector 121 transmits a control signal Ctrl to the counter 122, the counter 122 does not receive the display clock signal PWMCK or stops the operation. When the counter 122 does not receive the display clock signal PWMCK, the counter 122 does not perform counting operations. When the counter 122 stops operating, the counter 122 does not perform the counting operation even if the counter 122 receives the display clock signal PWMCK, thereby, the operation of the subsequent driving of the light emitting component 126 is stopped and the technical effect of saving power consumption of the display panel 100 is achieved.

The light emitting component 126 of the present application may be a micro LED, mini LED, or other light emitting components, and the display panel 100 may be a micro LED panel, mini LED panel, or other light emitting component display panels. The installation method of the data detection circuit 130 of the present application is not limited to be disposed in the controller 110 or the driver 120, the data detection circuit 130 may be disposed at any position within the display panel 100 according to actual needs, or in part of the drivers 120.

Through the driving structure of this display panel, the controller and the driver of the display panel may selectively generate display clock signals according to the content of the data signals, significantly reducing the overall power consumption of the display panel when the light emitting components do not need to display, thus saving electricity.

Therefore, the present application indeed possesses novelty, progressiveness, and industrial applicability, undoubtedly meeting the requirements for a patent application under the national patent law. Accordingly, a patent application has been legally filed, earnestly praying for the patent application grant to be issued soon.

However, the above description is merely an embodiment of the present application and is not intended to limit the scope of the present application. Therefore, all equivalent modifications and variations according to the structure, and the features described in the scope of the patent application should be included within the scope of this patent application.

What is claimed is:

1. A driving structure for a display panel, comprising:
- a controller, disposed on the display panel, generating a data signal and a display clock signal;
- at least one driver, disposed on the display panel, receiving the data signal and the display clock signal; and
- a data detection circuit, detecting a content of the data signal, wherein the data detection circuit is disposed in the controller, and when the data detection circuit detects that the content of the data signal is entirely non-display values, the controller stops generating the display clock signal.

2. The driving structure of claim 1, wherein the data detection circuit is disposed in both the controller and the at least one driver.

3. The driving structure of claim 1, wherein the controller generates an enable signal and transmits the enable signal to the at least one driver, and the at least one driver starts to receive the data signal and the display clock signal according to the enable signal.

4. The driving structure of claim 3, wherein the at least one driver comprises a first driver and a second driver, the first driver is coupled to the second driver in series, and the first driver transmits another enable signal to the second driver after the first driver receiving the enable signal.

5. The driving structure of claim 1, wherein the controller generates a data clock signal and transmits it to the at least one driver, and the at least one driver receives the data signal according to the data clock signal.

6. The driving structure of claim 5, wherein the at least one driver comprises a first driver and a second driver, the first driver is coupled to the second driver in series, and both the first and second drivers simultaneously receive the data clock signal.

7. The driving structure of claim 1, wherein the at least one driver comprises:
- a data receiver/detector, detecting the content of the data signal and allocating the data signal;
- a memory circuit, storing the data signal;
- a counter, generating a counting signal according to the display clock signal;
- a comparator, receiving the data signal and the counting signal and generating a comparison result; and
- a current source circuit, driving a light emitting component according to the comparison result.

8. The driving structure of claim 7, wherein the data receiver/detector comprises the data detection circuit, and when the content of the data signal is entirely non-display values, the data receiver/detector transmits a control signal to the counter to stop an operation of the counter, or to stop the counter from receiving the display clock signal.

9. The driving structure of claim 1, wherein the at least one driver comprises:
- a data receiver/detector, detecting the content of the data signal and allocating the data signal;
- a memory circuit, storing the data signal;
- a counter, generating a counting signal according to the content of the data signal and the display clock signal; and
- a current source circuit, driving a light emitting component according to the counting signal.

10. The driving structure of claim 9, wherein the data receiver/detector comprises the data detection circuit, and when the content of the data signal is entirely non-display values, the data receiver/detector transmits a control signal to the counter to stop an operation of the counter, or to stop the counter from receiving the display clock signal.

11. A driving structure for a display panel, comprising:
- a controller, disposed on the display panel, generating a data signal and a display clock signal;
- at least one driver, disposed on the display panel, receiving the data signal and the display clock signal; and
- a data detection circuit, detecting a content of the data signal, wherein the data detection circuit is disposed in the controller, and when the data detection circuit detects that the content of the data signal is entirely non-display values, the controller stops transmitting the display clock signal to the at least one driver.

12. The driving structure of claim 11, wherein the data detection circuit is disposed in both the controller and the at least one driver.

13. The driving structure of claim 11, wherein the controller generates an enable signal and transmits the enable signal to the at least one driver, and the at least one driver starts to receive the data signal and the display clock signal according to the enable signal.

14. The driving structure of claim 11, wherein the controller generates a data clock signal and transmits it to the at least one driver, and the at least one driver receives the data signal according to the data clock signal.

15. The driving structure of claim 11, wherein the at least one driver comprises:
- a data receiver/detector, detecting the content of the data signal and allocating the data signal;
- a memory circuit, storing the data signal;
- a counter, generating a counting signal according to the display clock signal;
- a comparator, receiving the data signal and the counting signal and generating a comparison result; and
- a current source circuit, driving a light emitting component according to the comparison result.

16. The driving structure of claim 11, wherein the at least one driver comprises:
- a data receiver/detector, detecting the content of the data signal and allocating the data signal;

a memory circuit, storing the data signal;

a counter, generating a counting signal according to the content of the data signal and the display clock signal; and a current source circuit, driving a light emitting component according to the counting signal.

17. A driving structure for a display panel, comprising:

a controller, disposed on the display panel, generating a data signal and a display clock signal;

at least one driver, disposed on the display panel, receiving the data signal and the display clock signal; and a data detection circuit, detecting a content of the data signal, wherein the data detection circuit is disposed in the at least one driver, and when the data detection circuit detects that the content of the data signal is entirely non-display values, the at least one driver stops receiving the display clock signal or stops operating.

18. The driving structure of claim 17, wherein the data detection circuit is disposed in both the controller and the at least one driver.

19. The driving structure of claim 17, wherein the controller generates an enable signal and transmits the enable signal to the at least one driver, and the at least one driver starts to receive the data signal and the display clock signal according to the enable signal.

20. The driving structure of claim 17, wherein the controller generates a data clock signal and transmits it to the at least one driver, and the at least one driver receives the data signal according to the data clock signal.

21. The driving structure of claim 17, wherein the at least one driver comprises:

a data receiver/detector, detecting the content of the data signal and allocating the data signal;

a memory circuit, storing the data signal;

a counter, generating a counting signal according to the display clock signal;

a comparator, receiving the data signal and the counting signal and generating a comparison result; and a current source circuit, driving a light emitting component according to the comparison result.

22. The driving structure of claim 17, wherein the at least one driver comprises:

a data receiver/detector, detecting the content of the data signal and allocating the data signal;

a memory circuit, storing the data signal;

a counter, generating a counting signal according to the content of the data signal and the display clock signal; and a current source circuit, driving a light emitting component according to the counting signal.

23. A driving structure for a display panel, comprising:

a controller, disposed on the display panel, generating a data signal and a display clock signal;

at least one driver, disposed on the display panel, receiving the data signal and the display clock signal; and a data detection circuit, detecting a content of the data signal, wherein the data detection circuit is disposed in the at least one driver, the at least one driver comprises a counter, and when the data detection circuit detects that the content of the data signal is entirely non-display values, the data detection circuit transmits a control signal to the counter to stop an operation of the counter, or to stop the counter from receiving the display clock signal.

24. The driving structure of claim 23, wherein the data detection circuit is disposed in both the controller and the at least one driver.

25. The driving structure of claim 23, wherein the controller generates an enable signal and transmits the enable signal to the at least one driver, and the at least one driver starts to receive the data signal and the display clock signal according to the enable signal.

26. The driving structure of claim 23, wherein the controller generates a data clock signal and transmits it to the at least one driver, and the at least one driver receives the data signal according to the data clock signal.

27. The driving structure of claim 23, wherein the at least one driver comprises:

a data receiver/detector, detecting the content of the data signal and allocating the data signal;

a memory circuit, storing the data signal;

a counter, generating a counting signal according to the display clock signal;

a comparator, receiving the data signal and the counting signal and generating a comparison result; and a current source circuit, driving a light emitting component according to the comparison result.

28. The driving structure of claim 23, wherein the at least one driver comprises:

a data receiver/detector, detecting the content of the data signal and allocating the data signal;

a memory circuit, storing the data signal;

a counter, generating a counting signal according to the content of the data signal and the display clock signal; and a current source circuit, driving a light emitting component according to the counting signal.

* * * * *